United States Patent [19]
Rathi

[11] Patent Number: 5,353,031
[45] Date of Patent: Oct. 4, 1994

[54] INTEGRATED MODULE CONTROLLER

[75] Inventor: Dev D. Rathi, Los Angeles, Calif.

[73] Assignee: ITT Corporation, New York, N.Y.

[21] Appl. No.: 96,514

[22] Filed: Jul. 23, 1993

[51] Int. Cl.$^5$ .......................... H01Q 3/22; H01Q 3/24; H01Q 3/26

[52] U.S. Cl. .................... 342/372; 342/154; 342/157

[58] Field of Search .......................... 342/372, 154, 157

[56] References Cited

U.S. PATENT DOCUMENTS

| | | | |
|---|---|---|---|
| 4,445,119 | 4/1984 | Works | 342/372 |
| 4,578,680 | 3/1986 | Haupt | 342/372 |
| 4,994,814 | 2/1991 | Aoki et al. | 342/372 |
| 5,017,927 | 5/1991 | Agrawal et al. | 342/371 |
| 5,093,667 | 3/1992 | Andricos | 342/372 |
| 5,103,232 | 4/1992 | Chang et al. | 342/372 |
| 5,206,655 | 4/1993 | Caille et al. | 343/700 MS |

Primary Examiner—Theodore M. Blum
Attorney, Agent, or Firm—Thomas L. Peterson; Arthur L. Plevy

[57] ABSTRACT

An improved system is disclosed for controlling the operation of a transmit/receive module in a phased-array antenna system. The improved module control system of the invention is implemented in a simple integrated circuit chip and may be co-located with a transmit/receive module positioned at an antenna array element. Either fully distributed or row/column distributed beam steering architecture may be implemented by the improved module control system with both speed of operation and cost advantages realized over prior art systems.

15 Claims, 13 Drawing Sheets

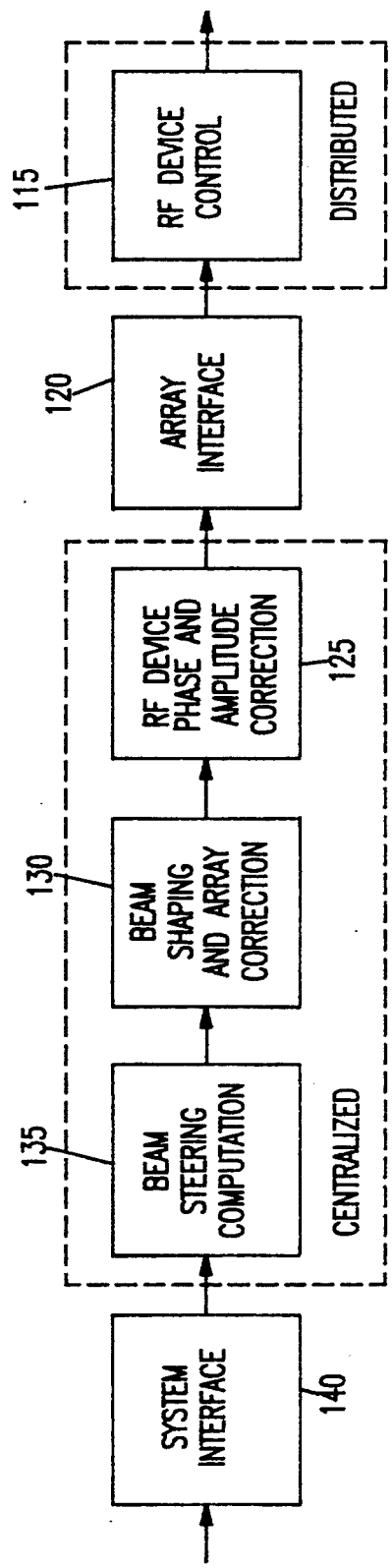
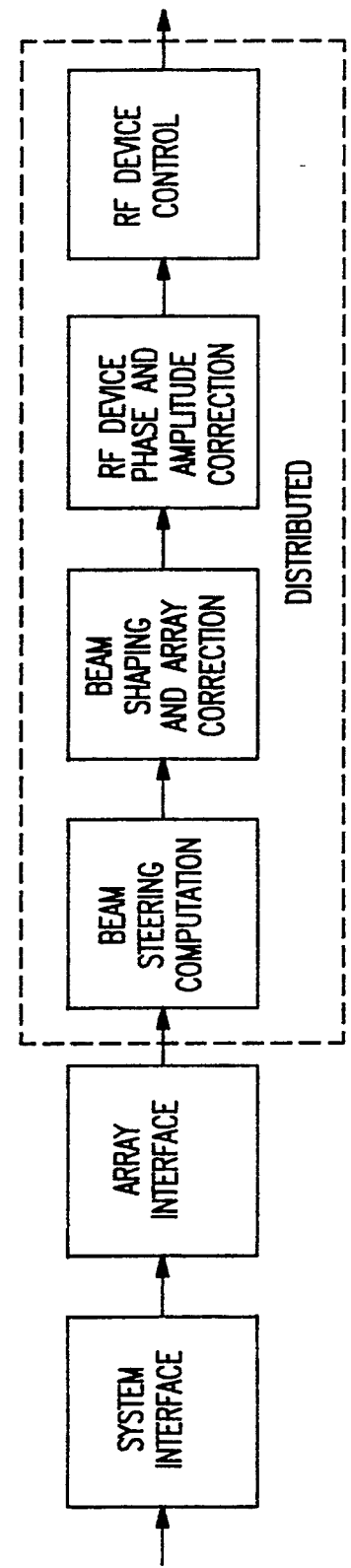
FIG. 2A
FIG. 2B

INTEGRATED MODULE CONTROLLER

FIELD OF THE INVENTION

This invention relates to an apparatus for controlling active array elements associated with phased array antenna systems.

BACKGROUND OF THE INVENTION

In response to increasingly complex antenna illumination requirements, particularly as to radar systems, much of the developmental work respecting antenna systems over the last two decades has been focused on phased array antenna systems. A phased array is essentially the special case of an antenna which, instead of having a continuous aperture, has an aperture composed of a number of individual radiating elements. The number of such radiating elements in the overall phased aperture may range from a few to many thousands, but typically will be at the upper end of that range. Although construction of an aperture out of many radiating elements involves a substantial increase in electronic and mechanical complexity, as compared to a single continuous aperture, such an array antenna system offers the very important advantage that the amplitude and phase of each radiating element may be controlled in such a way as to produce a desired aperture illumination distribution with substantial flexibility and accuracy. By varying the aperture illumination function a considerable variety of beam patterns may be realized from such a phased array antenna system and certain non-desirable effects, such as large sidelobe levels, may be minimized. For examples of such phased array antenna systems and descriptions of how they work, reference is made to the following sources: *Radar Handbook*, edited by Merrill Skolnik, 2nd edition, published by McGraw Hill, Inc. (1990) (see Chapter 7 entitled "Phased Array Radar Antennas" by Theodore Cheston and Joe Frank.); *Antenna Theory: Analysis and Design*, by Constantine A. Balanis, published by Harper & Row, Inc. (1982) (see Chapter 6 entitled "Arrays: Linear, Planer, and Circular"); *Antenna Theory and Design*, by Warren Stutzman and Gary Thiele, published by John Wiley & Sons, Inc. (1981) (see Chapter 3 entitled "Arrays", especially section 3.7 entitled "Phased Arrays").

Additionally, the flexibility to control the aperture illumination distribution confers another important advantage to phased-array systems, in that the illumination function may be controlled electronically, and thus rapidly, by changing the phase and amplitude of signals to or from the individual array elements. This characteristic is significant in allowing such an antenna to operate in a multi-function way, such as the performance of interlaced surveillance while simultaneously tracking a variety of targets. Changing both phase and amplitude in prescribed ways produces beam-steering and changes in the antenna pattern.

Array antennas are classified as either active or passive. An active array will contain phase shifting and amplification devices behind every element (or group of elements) of the antenna. Passive arrays, on the other hand, are driven from a single feed point. Active array antennas generally offer more flexibility and are capable of higher power than either passive array or conventional antennas.

With an active array antenna, electronic beam-steering of the antenna beam is normally accomplished through the use of an electronically controllable phase shifter at each array element. Additional versatility in such beam-steering may be accomplished through the use of both amplitude and the phase control elements at each array element.

A typical embodiment of such phase and amplitude control elements for placement at an array element of an active array antenna is illustrated in FIG. 1. In that figure, the phase shifting and amplification elements, along with transmit/receive switching elements, which will hereafter be collectively designated as the transmit/receive module, are shown enclosed by dashed-line box 10. This transmit/receive module 10, along with means for controlling the several elements of the transmit/receive module, designated as module control means 15, represent the electronic elements and interconnecting circuitry which will be located at each antenna element of an active array antenna system, and are collectively designated as antenna array elemental subsystem 20.

As will be seen in FIG. 1, in the transmit mode an RF signal enters the antenna array elemental subsystem 20 at RF feed 25 and is thereafter operated on by phase shifter 30, the output thereof passing through transmit/receive switch 35, which will be set at the transmit position, to transmitter gain control 40. That transmitter gain control 40 operates in conjunction with phase shifter 30 to establish the parameters of the beam emitted by the antenna array element driven by this transmit/receive module. The output of transmitter gain control 40 is fed to power amplifier 45 and thus, via circulator 50, to an antenna element 55 from which the transmitted beam is radiated.

In the receive mode, a signal received at antenna element 55 is routed via circulator 50 to transmit/receive switch 60, which will be set in the receive position, and thence to the input of low noise amplifier 65. From the output of low noise amplifier 65, the received signal traverses receive gain control 70, transmit/receive switch 35, which will be set in the receive position, phase shifter 30 and thence exits the antenna array element subsystem 20 via RF feed 25. Receive gain control 70 and phase shifter 30 cooperate in the receive mode to control the receive beam pattern so as, for example, to establish the placement of pattern nulls in the direction of interference sources.

As indicated by directional arrows on signal lines from module control means 15, the electrical settings for each of the electrically adjustable elements of transmit/receive module 10 for a given transmitted or received signal are controlled by module control means 15.

It will be understood that, in the receive mode, low noise amplifier 65, receive gain control 70 and phase shifter 30 may be operated either at RF or IF, with a down converter being introduced between antenna element 55 and the input to low noise amplifier 65 in the case of operation at IF.

As described above, each transmit/receive ("T/R") module, when viewed at a functional level, is comprised of RF circuitry and control circuitry. The complement and arrangement of the control circuitry for a T/R module depends on the beam steering architecture used. Three beam steering architectures are illustrated in FIGS. 2A, 2B and 2C. Using FIG. 2A as exemplary, the various control elements shown therein are functionally defined as follows:

RF Device Control 115 generates control signals for the RF circuitry within the T/R modules—i.e., Phase Shifter 30, Gain Controls 40 and 70, Power Amplifier 45, Low Noise Amplifier 65 and T/R Switches 35 and 60;

Array Interface 120 represents the interface between system elements located at the array radiating elements and other system elements;

RF Device Phase and Amplitude Correction 125 establishes compensation for internal errors of T/R module RF Circuitry from changes in operating temperature of a module and errors related to frequency changes, for all phase and gain states, and interactions therebetween;

Beam Shaping and Array Correction 130 accepts computed phase and gain settings from a central processor and modifies such settings for individual T/R modules by array correction term and tapering/beam spoiling term;

Beam Steering Computation 135 computes desired phase and gain settings based on such input parameters as: Beam Pointing, Module Row/Column Location, Antenna Type (Planar/Cylindrical) and Feed Type (Space/Corporate); and System Interface 140 establishes the interface between the array components downstream from that interface and the system providing a signal to the array antenna, such as a radar system or a communications system.

It will be understood that, in an active-array antenna system, RF device phase and amplitude corrections should preferably be co-located with the RF circuitry to which such correction factors are to be applied. With such co-location, the T/R module becomes a stand-alone device, independent of antenna type or application and invariant to technology or process changes. As will be seen, each of the illustrated beam-steering architectures incorporates this desired co-location. Beyond that common trait, however, the three illustrated beam-steering architectures differ in many important respects.

The beam-steering architecture of FIG. 2A incorporates centralized beam position computation, correction and correction-data storage. While this architecture has an advantage in that the module dependent corrections can be combined with the antenna dependent corrections whenever field calibration of the antenna is done, its many disadvantages strongly outweigh that advantage. Among the more important disadvantages of this architecture are:

The correction terms are technology dependent, process dependent and temperature dependent. This being the case, any change in either technology, process or temperature would necessitate re-calibration of the antenna in the field, resulting in high-maintainability costs and relatively lower system availability.

Since correction data are centralized, the individual T/R modules will be interchangeable if, and only if, correction data is also interchangeable. To achieve such a goal would substantially increase house-keeping costs and also reduce system availability. In practice, modules will not be freely interchangeable.

To achieve the cost effectiveness of centralized processing, it is essential that magnetic disk storage be used for centralized storage of correction data. With such an arrangement, a considerable amount of time would be lost in data manipulation and beam position updates, thus defeating the very purpose of phased-array antennae. As will be well known, phased-array antennae are employed in high performance systems such as radar primarily to exploit the faster look-back, scan-back and look-forward (scan forward) capabilities of such systems which cannot be realized in mechanically scanned antennae.

To summarize with respect to the centralized beam steering architecture of FIG. 2A, the advantage of combining antenna frequency dependent correction terms with module dependent correction terms during field calibration of the antenna must be weighed against the substantial disadvantages of poor system response time, high maintainability costs and poor system availability.

In the beam-steering architecture of FIG. 2B, RF corrections (module corrections) are achieved using a curve-fitting type algorithm. Each element "knows" its position in the array, and computes its phase and gain settings using that position, its unit pointing vector and correction factors in the computation. While this architecture overcomes many of the disadvantages of the architecture of FIG. 2A, it introduces new disadvantages, as described below:

The functional relationship, F(), between various parameters is of the following form:

$\Phi_s = F(\Phi_c, G_s, f_c, T)$
$G_s = F(G_c, \Phi_s, f_c, T)$ where,
$\Phi_s$ = Phase setting as seen by the module,
$G_s$ = Gain setting as seen by the module,
$\Phi_c$ = Control phase, a system parameter,
$G_c$ = Control gain, a system parameter,
$f_c$ = Control frequency, a system parameter,
T = Module temperature which is a function of environment, module location in the array, and the transmit or receive mode of operation.

As will be seen, the phase setting and gain setting relationships are inter-dependent and have complex relationships. In order to devise any meaningful curve fitting type algorithm, one needs a large database each time a change in technology or process occurs. Since T/R module technology continues to evolve, such a large database invariant to both process and technology changes is not available and is unlikely to be available for a long time to come.

As is well known, because of the usually very large number of array elements in a phased-array antenna system, the cost of the T/R modules, which must be multiplied by the number of array elements, is critical in determining economic feasibility for a phased-array antenna application. The T/R module cost drivers are: RF circuitry cost, digital control circuitry cost and the RF shielded connector cost. In the beam-steering architecture of FIG. 2B, each array element will contain RF circuitry, digital arithmetic computation and correction circuitry and MxN addressing, where M is the number of rows and N is the number of columns in the array. For the completely distributed architecture of FIG. 2B, each element must have $\lceil \log_2 M \rceil + \lceil \log_2 N \rceil$ connector pins-"$\lceil \cdot \rceil$" designating a least integer bigger than (.). As will be apparent, such a distributed architecture arrangement will result in a higher module cost because of the distributed arithmetic computation circuitry and the number of interfacing connector pins.

Accordingly, it is an object of the invention to realize the operational advantages of a distributed beam-steering architecture while maintaining costs per array element at a significantly lower level than has heretofore been accomplished with that architecture.

SUMMARY OF THE INVENTION

An improvement for an active array antenna system, such system comprising beam steering computation means for computing array phase and gain settings, beam shaping and array correction means for applying array correction, tapering and beam spoiling terms to the computed array phase and gain settings and a transmit/receive means including phase shifting means, gain control means, power amplifying means, low-noise amplifying means and transmit/receive switching means, which improvement comprises an RF device control means operable to control devices included in the transmit/receive means and an RF device phase and amplitude correction means operable to compensate for errors associated with devices included in the transmit/receive means, wherein the RF device control means and the RF device phase and amplitude correction means are operationally integrated within a common module.

BRIEF DESCRIPTION OF THE DRAWINGS

FIG. 2A Depicts a prior-art embodiment of a beam steering architecture.

FIG. 2B Depicts another prior-art embodiment of a beam steering architecture.

DETAILED DESCRIPTION OF THE INVENTION

Figure 1:
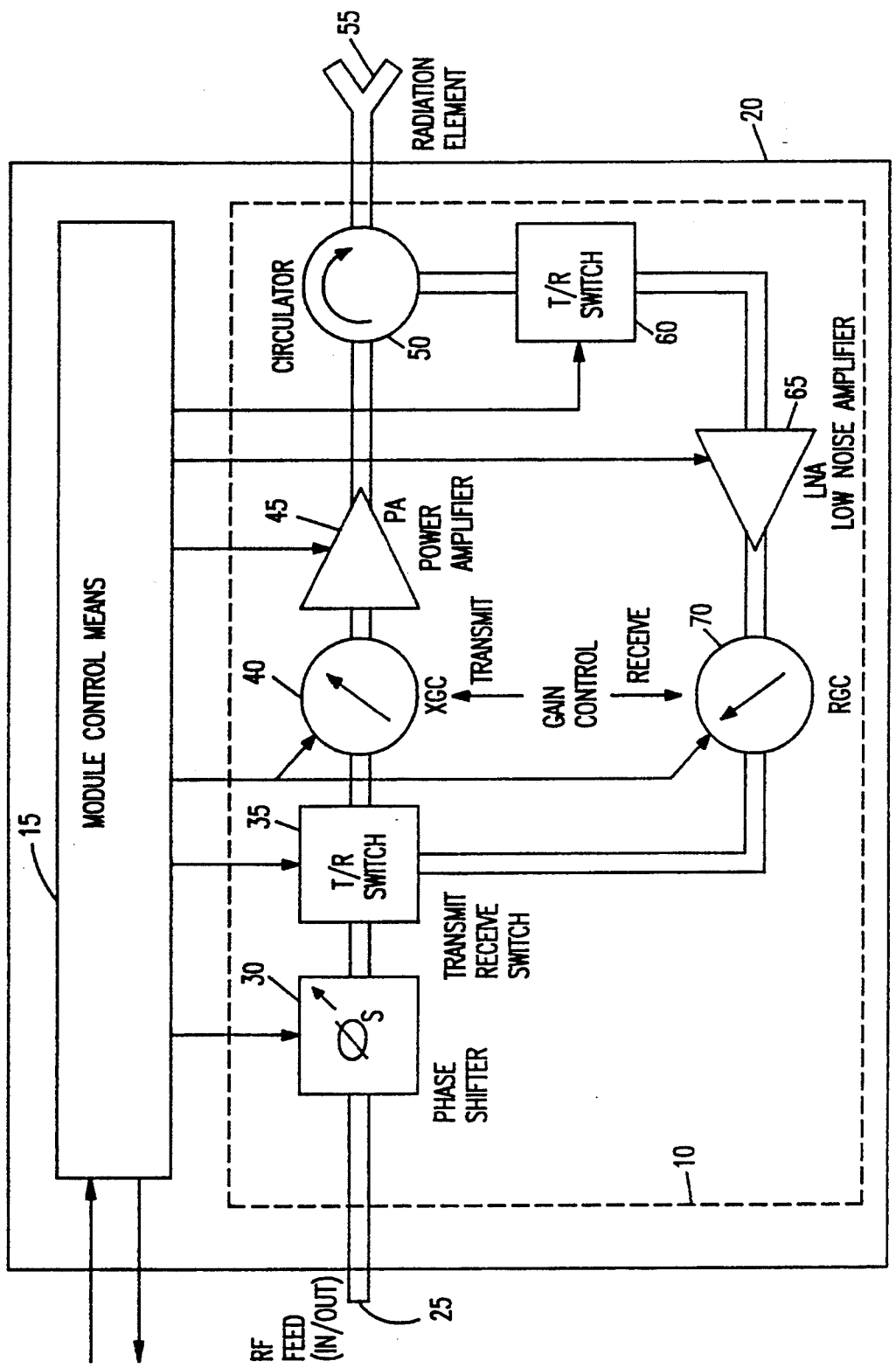
FIG. 1 Depicts a prior-art embodiment of phase and amplitude control elements for an active array antenna.
Figure 2C:
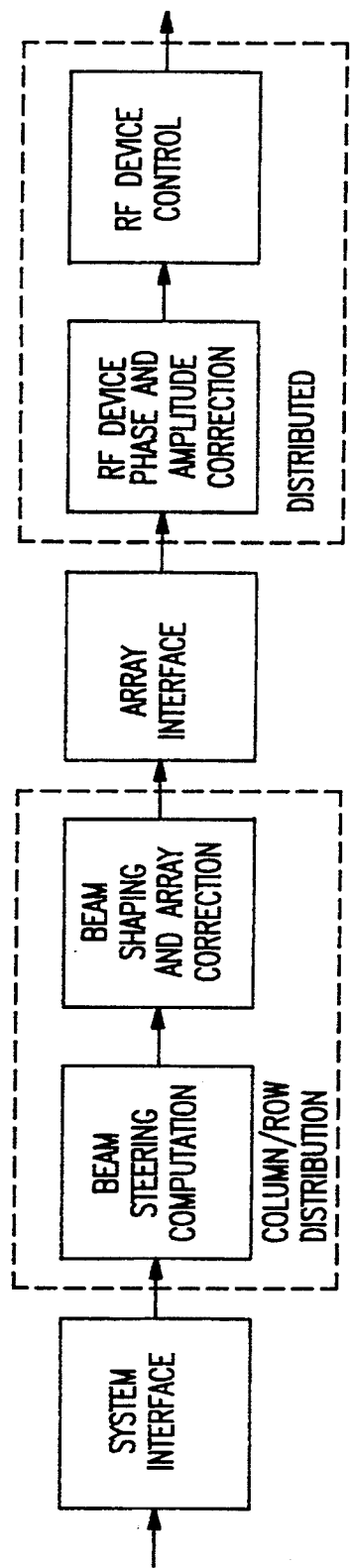
FIG. 2C Depicts the beam steering architecture of the invention.
Figure 3:
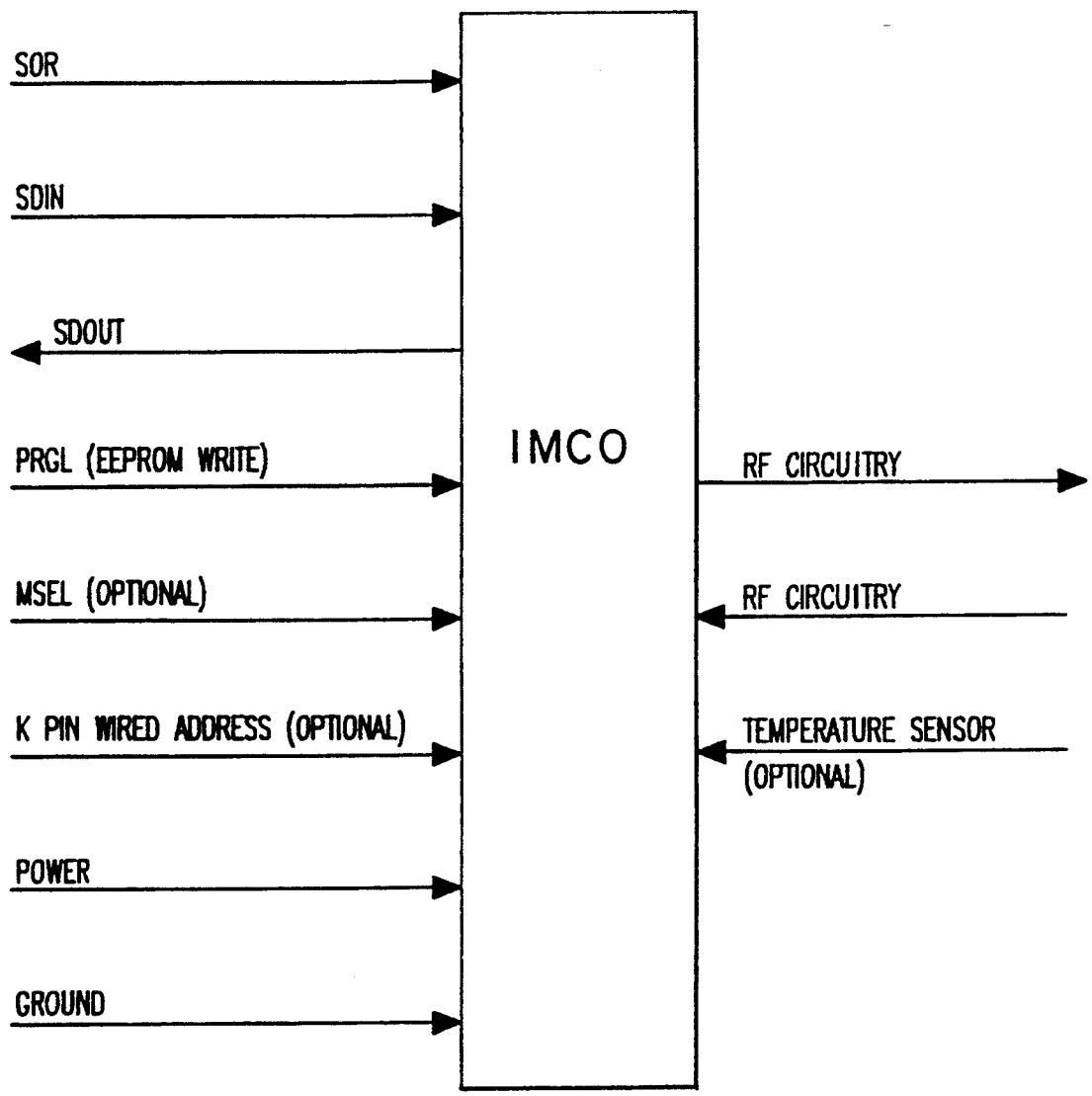
FIG. 3 Depicts the interface between the module controller of the invention and various input and output links.
Figure 4:
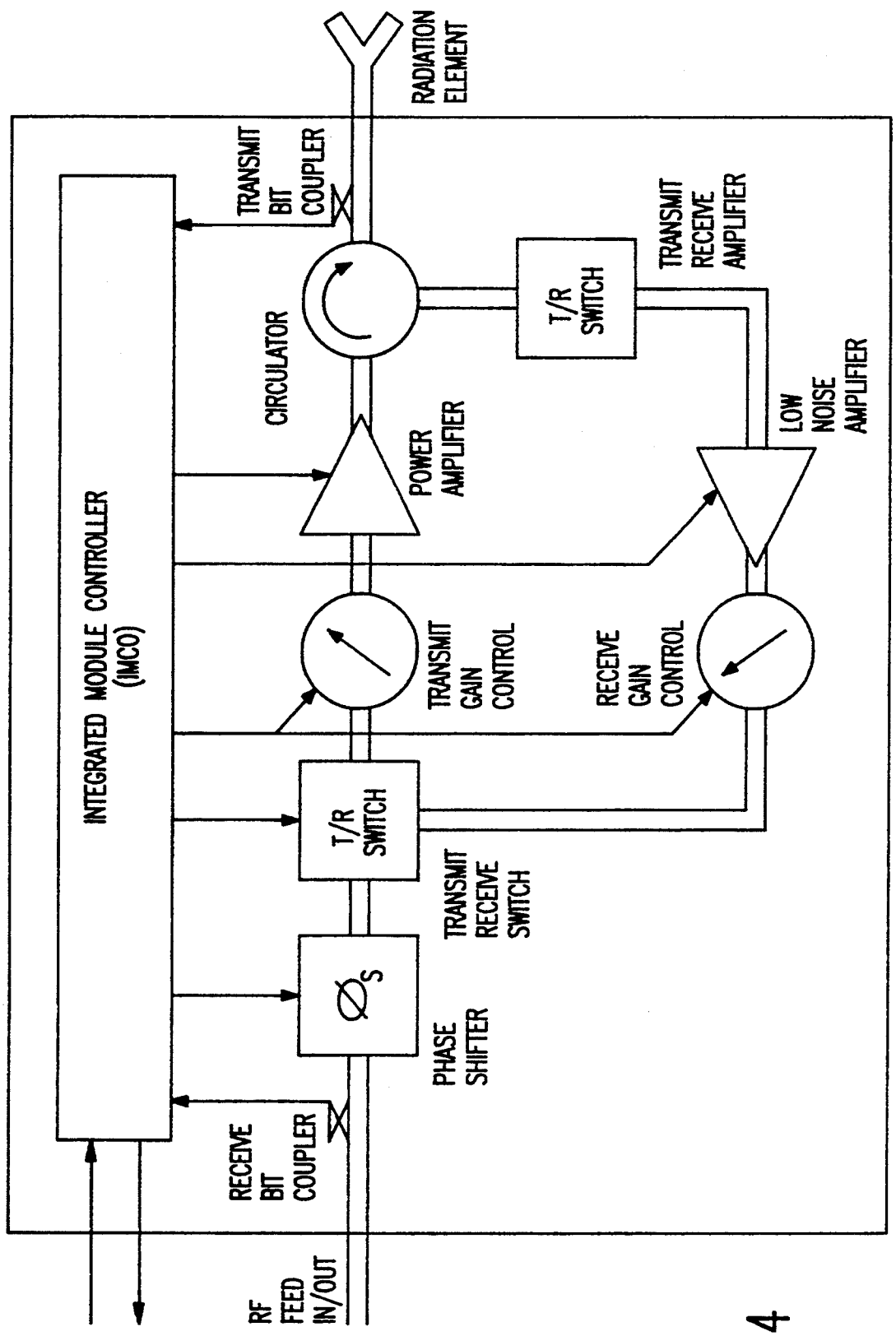
FIG. 4 Illustrates the integration between the module controller of the invention and an associated T/R module.

The invention incorporates the entire T/R module control means (digital, analog, and EEPROM) into an integrated package which may be implemented in a single integrated circuit chip and be readily co-located with the T/R module. The invention has been designated "Integrated Module Controller" and will be referred to herein by the acronym "IMCO". FIG. 3 depicts the input and output signals from the IMCO and FIG. 4 illustrates the integration between the IMCO and the T/R module previously described and illustrated in FIG. 1. The beam-steering architecture of the invention is depicted in FIG. 2C. This architecture provides for the co-location of the module dependent correction circuitry with the RF circuitry while the beam steering and beam shaping functions are performed elsewhere.

In respect to FIG. 3, note should be made that the "MSEL" and the "K Pin Wired Address" inputs are optional signal lines, being used only in a common bus configuration for the IMCO. The variable "K (in "K Pin Wired Address") is defined as:

$$K = \min[\lceil \log_2 M \rceil, \lceil \log_2 N \rceil]$$

where, $\lceil \cdot \rceil$ is a ceiling operator, denoting least integer bigger than (.), M = maximum number of elements in any row, N = maximum number of elements in any column.

Among the advantages of the IMCO over prior-art devices are the following:

Utilizes phase modulated input data, from which both data bit and clock are derived. With phase modulated data, synchronization problems associated with a clock and data scheme (i.e., transport delays) are non-existent. Thus, no internal or external clocks are required. All data is delivered to the module asynchronously.

Flexible interface control structure. Specifically, the optional module select line, MSEL, or the optional K Pin Wired Address provides the capability to connect the input signal, SDIN, in a common bus configuration.

Supports an SDIN data transfer rate up to 10 MBS utilizing asynchronous phase modulation. Where data is phase modulated, the output signal, SDOUT, data transfer rate is 5 MBS, and otherwise is the same as the SDIN data transfer rate.

Output signal, SDOUT is tristatable and may be used in a common bus configuration thereby eliminating the need for a separate line from each element on the bus.

Supports internal diagnosability through monitoring of the SDOUT signal to provide foldback data and other Built-in-Test (BIT) information.

Includes input registers, holding registers, resident EEPROM correction data storage and output registers. Such output registers can be selected through the control line SOR or through the operation code, thereby facilitating Continuous Wave (CW) or Pulse Mode operation for communication or radar applications, respectively.

Supports two alternatives for generation of correction (calibration) data and its subsequent storage into the resident EEPROM. Such data may be generated individually in the laboratory or in the field when the module has been placed in an antenna. Where laboratory calibration is used, modules will be freely interchangeable in the field. When the field calibration option is used, frequency dependent antenna feed correction can be incorporated in the module correction data, but the modules will not be interchangeable without additional calibration.

Supports transmit/receive/standby mode switching capability.

Resident EEPROM will accept either external or internal temperature addressing.

Adaptable to various module array configurations (architectures). In particular, the following configurations are readily supported:

(a) Dedicated SDIN Line—With this configuration, each module in an array has its own data line. Among the advantages of such configuration are the avoidance of ($Log_2M + Log_2N$) address pin requirements as in the beam steering architecture illustrated in FIG. 2B, and faster update time with the same performance as the distributed architecture of FIG. 2B.

(b) K Pin Wired Address Bussed SDIN Line—This configuration represents a semi-distributed architecture where bussed elements in a common row or common column share the SDIN Line using the K connector pins for addressing. Such addressing is achieved by comparing the K Pin Wired Address with the commanded address through the SDIN Line. This configuration is a preferred embodiment of the invention and corresponds to the beam steering architecture of FIG. 2C.

(c) MSEL Address Bussed SDIN Line—In this semi-distributed architecture, bussed elements in a common row or common column share the SDIN Line using the optional MSEL Line to each element for addressing. This configuration would also be a preferred embodiment of the invention and corresponds to the beam-steering architecture of FIG. 2C.

Figure 5A:
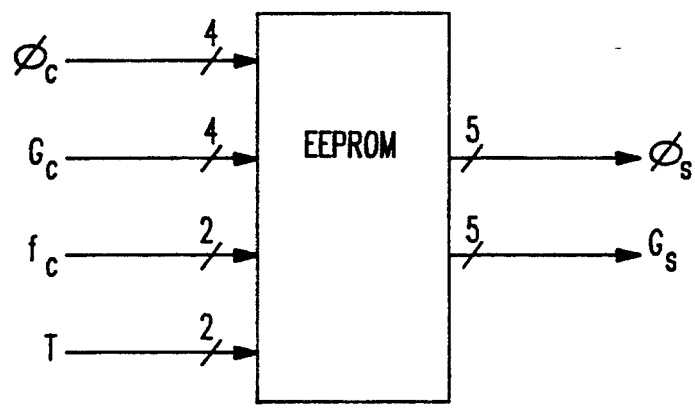
FIG. 5A Depicts implementations of the EEPROM of the invention with phase gain interactions.
Figure 5B:
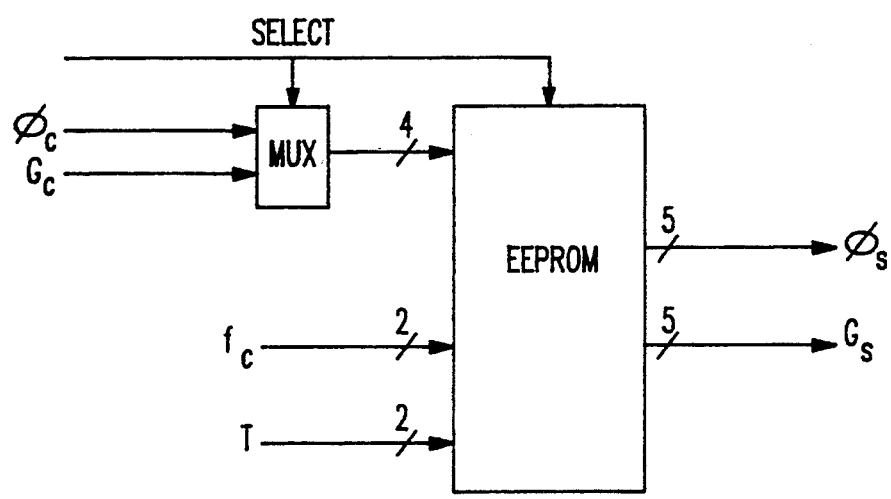
FIG. 5B Depicts implementations of the EEPROM of the invention without phase gain interactions.

The IMCO architecture is general and can be adapted for other control means, such as interpolation-type algorithms when technology matures and a large database becomes available to devise such an algorithm. Consider, for example, a hypothetical performance requirement as follows:

Control Phase $\Phi_c$: 4 Bits
Control Gain $G_c$: 4 Bits
Control Frequency Code $f_c$: 2 Bits
Control Temperature Code: 2 Bits
Output to Module: $\Phi_s = 5$ Bits
$G_s = 5$ Bits The memory requirement, as implemented in the EEPROM, will be: $8K \times 8$ bits with phase and gain interactions, and $1K \times 8$ bits without phase and gain interactions. The EEPROM configurations corresponding to these two states are shown in FIGS. 5A and 5B. Similarly, if, for example, a database is available from which module behavior may be reliably predicted over a temperature range, the module could be calibrated at one temperature, and thereafter phase setting $\Phi_s$ and gain setting $G_s$ could be determined through interpolation for any other temperature. Note that, in addition to avoidance of the need to calibrate each module for temperature changes, the use of such a prediction algorithm would result in a reduction in memory requirement for the module.

Fundamentally, the IMCO performs two operations: (1) RF device control and (2) RF device phase and amplitude corrections, i.e., module specific corrections. The corrections performed are over the temperature range experienced by the module and throughout its frequency band, for all phase and gain states, and interactions therebetween. In general, the data supporting such corrections is derived from the IMCO's memory using a table look-up methodology. Such table data may be generated from laboratory bench data or field data. When laboratory bench calibration data is used—i.e., by storing such data in the resident EEPROM, the modules become completely interchangeable and module-to-module tracking is facilitated. As will be appreciated, such a calibration mode is very desirable for high-yield volume production. Alternatively, using field calibration, when calibration data specific to the array location for the module is stored in the EEPROM, antenna frequency dependent feed correction terms may be combined with RF device correction terms. In this circumstance, however, the modules will not be interchangeable without recalibration.

Figure 6:
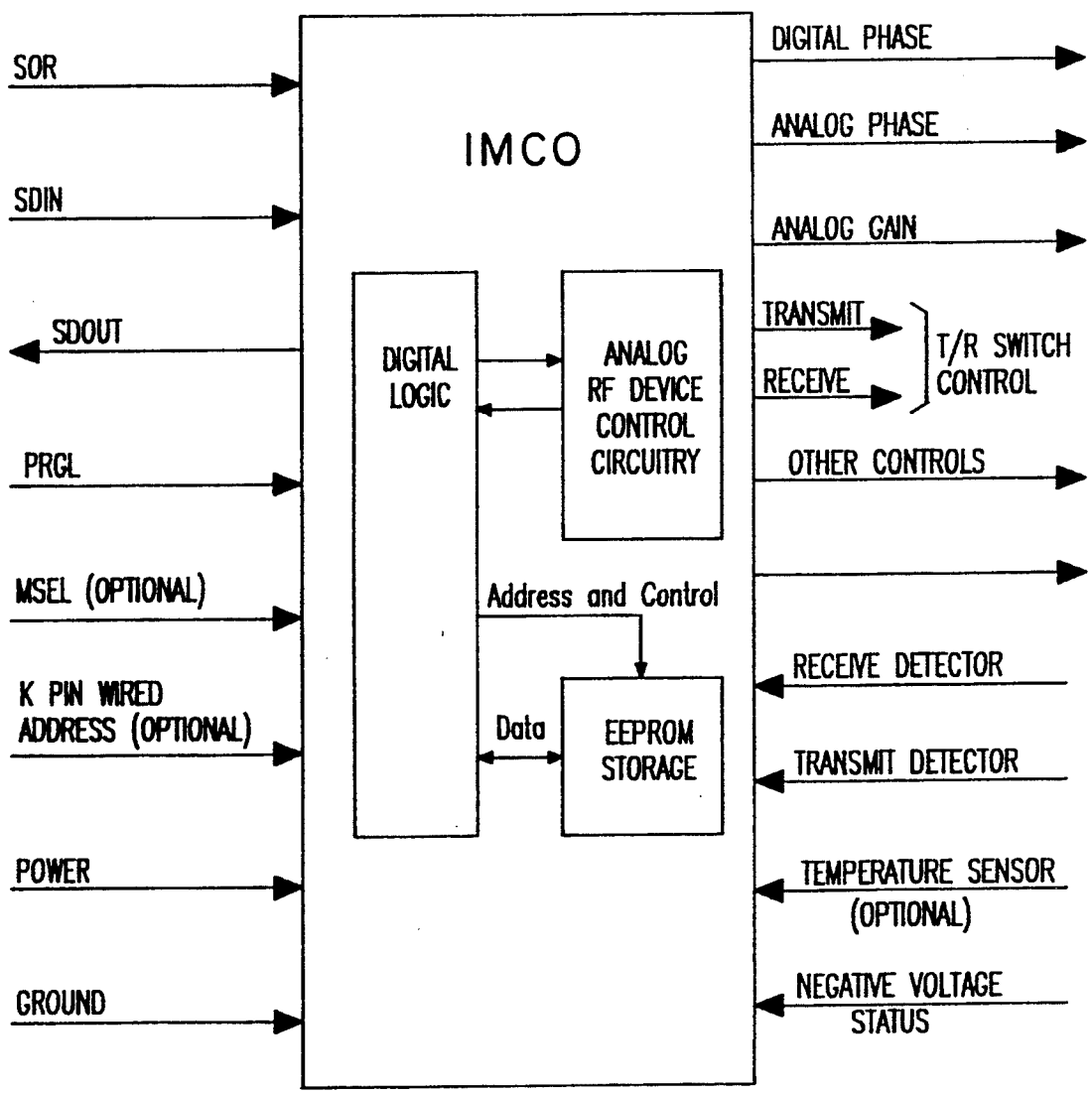
FIG. 6 Depicts in block diagram form the module controller of this invention.

The IMCO is intended to be implemented on one application specific integrated circuit (ASIC). The building blocks of the IMCO are illustrated in FIG. 6. As will be seen in that figure, the IMCO architecture is described in terms of: (1) digital logic, (2) analog RF device control circuitry, and (3) EEPROM storage. As will be described more fully hereafter, this architecture is unique in its flexible control structure, built in programming (i.e., calibration) capability and diagnosability. And, the single-chip integrated architecture of the IMCO offers clear advantage over the non-integrated (i.e., at least three chips) architecture of the prior art. In particular, the IMCO chip eliminates interconnection costs and produces a significant reduction in overall device costs as well as testing and maintainability costs.

As will be appreciated from FIG. 6, along with FIG. 4, the IMCO is integrated within itself and also within the T/R module. In the following sections, the operation and functional interrelationships of the IMCO building blocks illustrated in FIG. 6 are described.

A. Digital Logic

Figure 7:
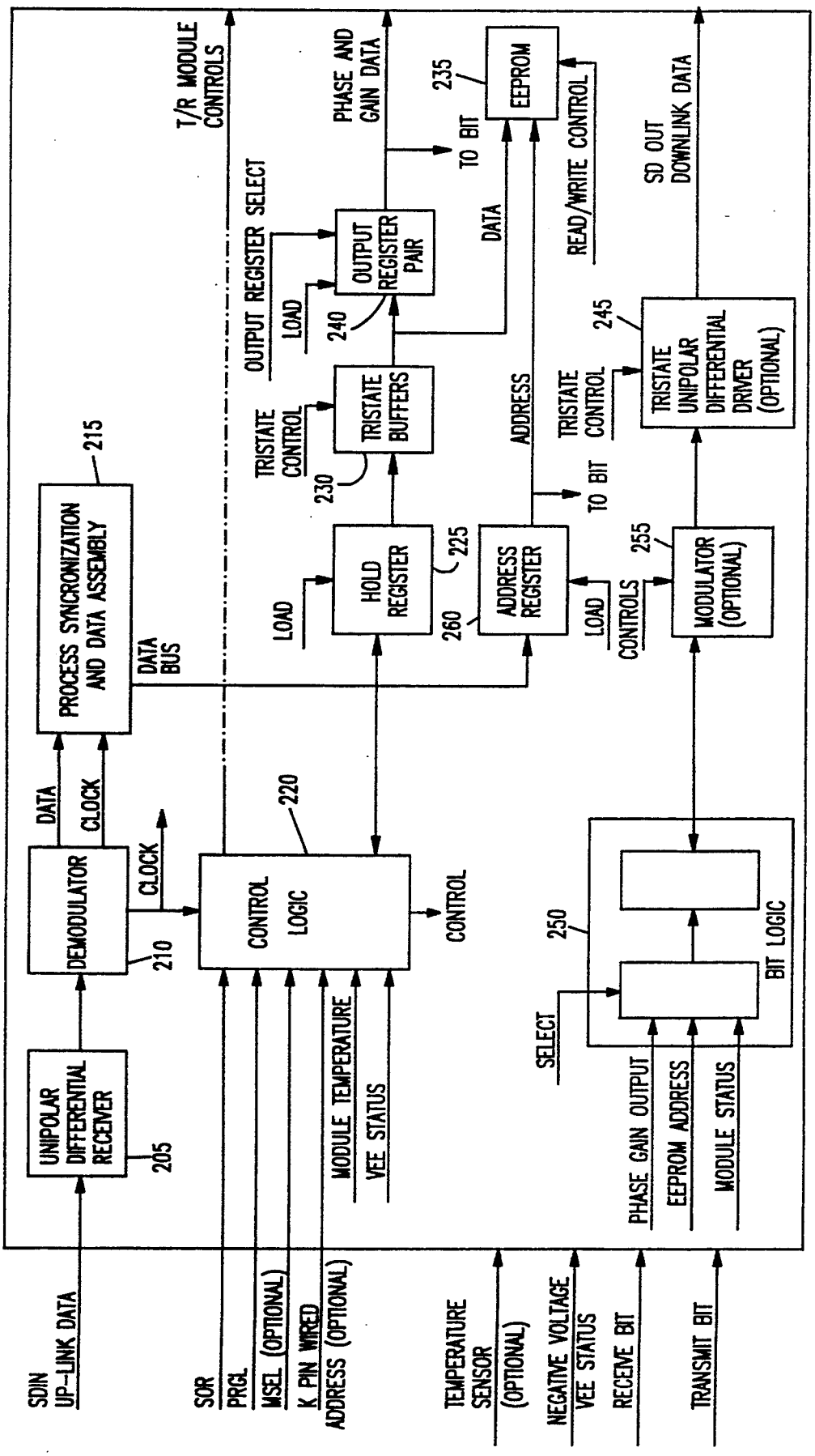
FIG. 7 Depicts in block diagram form the digital logic circuitry of the invention.
Figure 8:
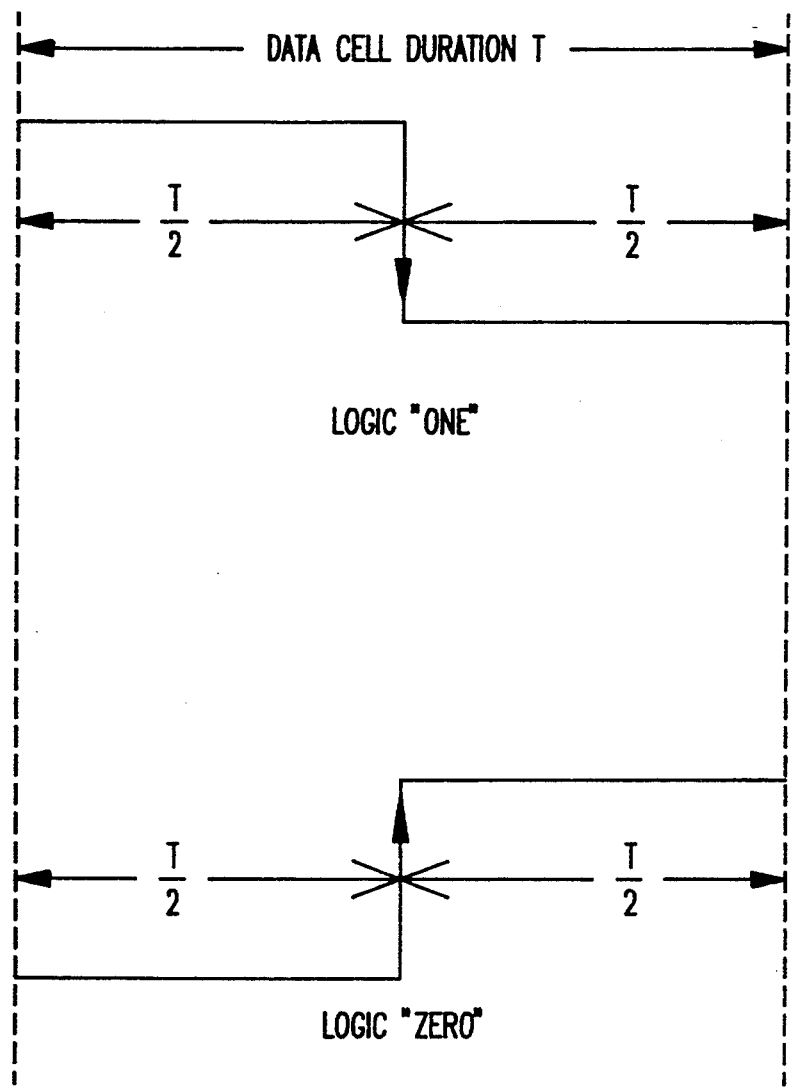
FIG. 8 Depicts schematically definitions for a logical one and a logical zero for the logic circuits of FIG. 7.

FIG. 7 shows, in block diagram form, the elements comprising the digital logic circuitry of the IMCO, and interconnections therebetween. In the illustrated embodiment, bit-serial input data stream SDIN is phase modulated. This phase modulation allows the SDIN signal to be transmitted to the IMCO asynchronously and thereby avoids the need for clocks. Specifically, with such phase modulation, a high-to-low transition in the middle of a data cell defines Logical One. Similarly, a low-to-high transition in the middle of a data cell defines the Logical Zero. These data modulation definitions are shown schematically in FIG. 8.

Figure 9:
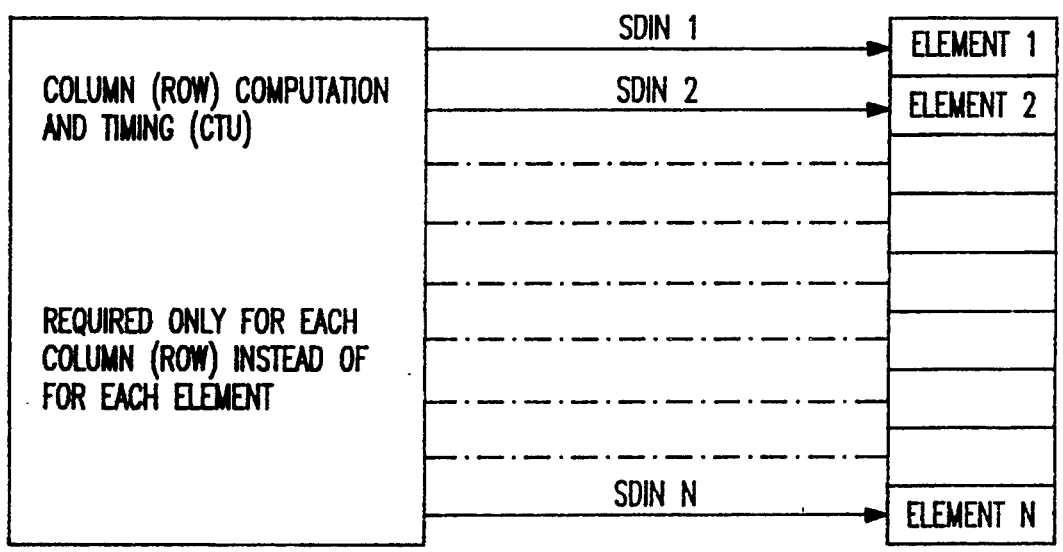
FIG. 9 Depicts a typical format for input data operated on by the invention.

FIG. 9 illustrates a typical format for SDIN input data. As can be seen in the figure, the typical SDIN signal starts with a 3-bit SYNC character, followed by a 4-bit operation code (OPCODE), followed by optional program, address, or OPCODE qualifier data, and ending with a series of ones or zeros long enough to allow the IMCO to complete the requested operation before the next SDIN command is received. The optional data will be present in the SDIN signal only if required by the particular OPCODE used. SDIN signal commands may be module specific, in which case they operate on only one module at a time and their data format is configuration dependant, or they may be global, in which case they operate on all modules at the same time and their data format is configuration independant. An example of a module specific command is one which instructs the IMCO of a particular module to store a certain address in its address register for EEPROM programming purposes. An example of a global command is one which is sent to the IMCOs of all modules informing them of whether internal or external temperature addressing will be used. For module specific commands, FIG. 9 represents the SDIN data format for a preferred system configuration and FIGS. 10 and 11 show the SDIN data formats for two other possible system configurations.

The modulated unipolar differential signal SDIN is received by Unipolar Differential Receiver 205 (FIG. 7) and demodulated by Demodulator 210. The data and clock from the phase-modulated input signal SDIN is extracted by the Demodulator. Process Synchronization and Data Assembly Means 215 accomplishes synchronization of the data by detecting the SYNCH character (illustrated in FIG. 9) in the input data stream and assembling the input data for use by other elements of the digital logic circuitry. After the Process Synchronization and Data Assembly Means downloads the assembled data onto the data bus, Control Logic Unit (CLU) 220 inputs the data and reads the OPCODE to determine what operation to perform. The CLU then generates control signals for the various elements of the digital logic circuitry depending upon the operation it is to perform. For instance, if the CLU receives a write command over the SDIN line and the PRGL signal (FIG. 7) is logic low, the CLU will use the READ/WRITE CONTROL line to signal the EEPROM to write the program data currently stored in Tristate Buffer 230 into the storage location specified by the address currently stored in Address Register 260.

When operating the IMCO in the programming mode, a typical sequence of SDIN commands will be as follows:

(1) The first SDIN command will contain the EEPROM address to which program data is to be stored and will instruct the CLU to load this address into the Address Register 260. The CLU will then download the address data onto the CLU data bus and signal the Address Register to load the address into its memory. The address data will include control phase, frequency, operation mode, and temperature. In the preferred embodiment of the invention, the operation mode will be described by four digital bits defining sixteen operational states, including three transmit states and thirteen receive states. The temperature data may optionally be derived internal to the T/R module (i.e., through the use of a temperature probe and digital-to-analog converter) in which case the CLU will have to append it to the address data received over the SDIN line before loading the Address Register. If this option is exercised, an SDIN signal will have to be sent to all modules before any programming is done to inform the modules that internal temperature addressing is being used.

(2) The next SDIN command will contain program data and will instruct the CLU to load this data into Hold Register 225 and Tristate Buffer 230. The output of the EEPROM will be disabled during the programming mode. In the preferred embodiment, the program data will include 5-bits of correction phase data for controlling a digital RF phase shifter, 4-bits of correction phase data which will be converted to an analog signal for controlling an analog RF phase shifter, and 7-bits of correction gain data which will be converted to an analog signal for controlling the RF gain control elements.

(3) The next SDIN command will instruct the CLU to load the active register of Output Register Pair 240 with the program data stored in the Tristate Buffer. After this command is performed, and the appropriate phase and gain data are converted to analog signals, the three RF control signals will be sent to their respective RF components. RF phase measurements will now have to be performed on the T/R module to determine if the program data relating to corrected phase, which came in as part of the SDIN command, produces a module output phase within a certain tolerance of the desired control phase. If the correction phase data does not produce the desired output phase, then steps 2 and 3 will have to be repeated until the measured output phase is within such tolerance.

(4) When the correction phase data stored in the Tristate Buffer and the active register of the Output Register Pair produces the desired output phase, the next SDIN command will instruct the CLU to write the correction data into the memory location of the EEPROM corresponding to the address stored in Address Register. But, before this can be done, the PRGL signal (FIGS. 6 and 7) must be changed to a logic zero from its normal state of logic one.

In order to have correction data stored for all combinations of control phase, frequency, operation mode, and temperature, the above steps will be repeated for each memory location of the EEPROM. Programming of the EEPROM is random access; and, therefore, the contents of any particular memory location may be changed at any time without having to change the contents of any other memory location. As previously discussed, program data can be written to the EEPROM either at a laboratory bench or in a field setting. All RF phase testing must be done at the frequency and temperature defined by the address stored in the Address Register at the time of the test.

When operating the IMCO in the normal operating mode, a typical sequence of SDIN commands will be as follows:

(1) The first SDIN command will include the EEPROM address of the memory location which contains the desired correction data for transmit mode. As was the case in the programming mode, the address received as part of this SDIN command may or may not include temperature data, depending upon whether internal or external temperature addressing is being used. The command will instruct the CLU to load this address into the Address Register. Once the address is stored in the Address Register, the contents of the corresponding EEPROM memory location will be output onto the EEPROM data bus.

(2) The second SDIN command will instruct the CLU to update the contents of register A of Output Register Pair 240 with the data currently on the EEPROM data bus. Depending upon whether register A is currently active, this data may or may not be sent to the RF circuitry at this point.

(3) The third SDIN command will include the EEPROM address of the memory location which contains the desired correction data for receive mode. The command will instruct the CLU to load this data into the Address Register. Once this address is stored in the Address Register, the contents of the corresponding EEPROM memory location will be output onto the EEPROM data bus.

(4) The fourth SDIN command will instruct the CLU to update the contents of register B of Output Register Pair with the data currently on the EEPROM data bus. The Output Register Pair now has transmit mode correction data stored in register A and receive mode correction data stored in register B. The system can now switch between these two registers during the corresponding transmit and receive periods of the T/R module. Switching between the registers can be done using either the SOR control line or an SDIN signal. Using the SOR line, a logic low selects register A and a logic high selects register B. Using an SDIN signal, the SOR line must be kept in a logic high state while an SDIN signal with the appropriate OPCODE for the desired output register is delivered to the IMCO.

When a particular register of the Output Register Pair is made active, the correction data stored in that register is sent to the corresponding RF components. For example, when register A is made active, a 5-bit corrected phase signal is sent to the digital RF phase shifter, a 4-bit corrected phase signal is converted to analog and sent to the analog RF phase shifter, and a 7-bit corrected gain signal is converted to analog and sent to the transmit gain control element. The contents of registers A and B must be constantly updated as things such as temperature, frequency, beam position, and beam shape change.

The Built-in-Test (BIT) means of the IMCO provides diagnostic information through the bit-serial output signal (SDOUT). When the main system computer needs diagnostic information to determine if a particular module is performing correctly, it sends an SDIN signal to that module. The SDIN signal contains an OPCODE which instructs the CLU to enable the SDOUT line for the module. As discussed below, however, this SDIN command is only necessary if the optional Tristate Unipolar Differential Driver 245 is being implemented. Another SDIN signal is now sent to the module specifying the type of diagnostic information desired. The selectable diagnostic data outputs are EEPROM Address, Phase/Gain Output, and Module Status (FIG. 7). Module Status may include negative voltage (VEE) status, receive BIT, transmit BIT, and module temperature. The CLU uses the SELECT signal line to instruct BIT Logic Unit 250 which diagnostic data to send through to the SDOUT data line.

SDOUT may be phase modulated before it is sent out with the use of optional Modulator 255. This modulator can be turned on and off by sending an SDIN signal containing the appropriate OPCODE to the module. If SDOUT is phase modulated, then the data transfer rate will be half that of the input data transfer rate (SDIN). Otherwise, SDOUT and SDIN will have identical data transfer rates.

The IMCO may also make use of optional Tristate Unipolar Differential Driver (TUDD) 245 which will allow all of the modules to use a common SDOUT data bus. Downloading of data onto the SDOUT bus would be controlled by the TRISTATE CONTROL signal generated by the CLU. The CLU will enable the TUDD whenever the appropriate SDIN signal is received by the module.

Three system architecture configurations are supported for the IMCO: (1) SDIN by itself, (2) SDIN in conjunction with the optional MSEL control line, or (3) SDIN in conjunction with the optional K Pin Wired Address. Whenever the configuration being used by the system is changed, an SDIN signal must be sent to all modules informing them of the change. The three configurations are described below.

A.1 SDIN

In this configuration, each element in an array has its own dedicated input signal line, SDIN. As will be appreciated., this is a completely distributed architecture. Since all elements receive data in parallel, the array update time is equal to the update time for a single element. FIG. 9 illustrates a typical data format and the column/row signal distribution structure for this configuration.

A.2 SDIN In Conjunction with MSEL

This configuration will be characterized as a row or column distributed structure. Because of signal distribution considerations, a minimum number of row elements or column elements are bussed, with each element having its own MSEL control line. Each element on the bus accepts data when selected (enabled) through its MSEL line. The array update time is equal to the update time of one element multiplied by the number of elements on a column or row bus.

Figure 10A:
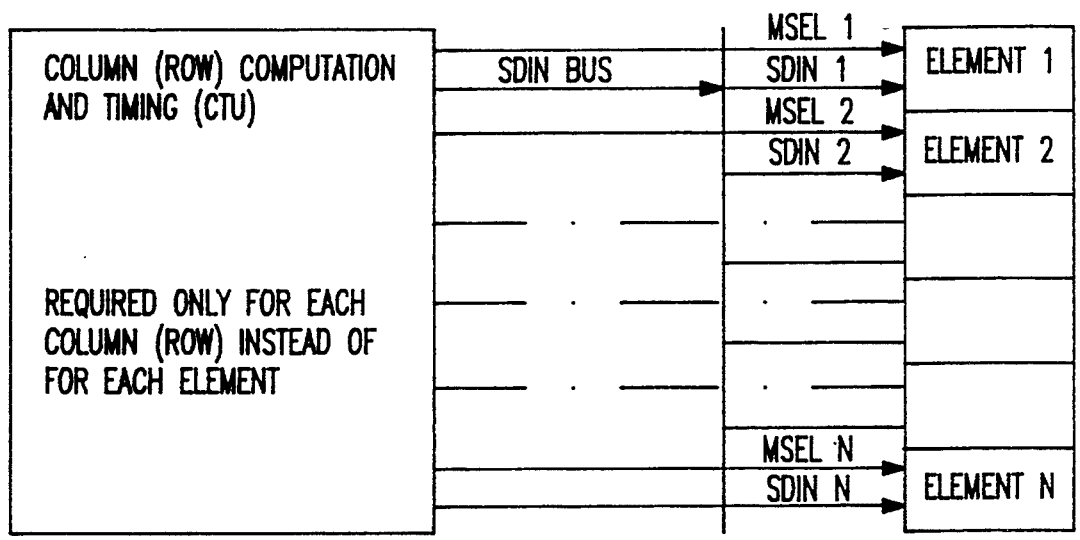
FIG. 10A Depicts a typical column/row distribution for input data using the MSEL functionality of the invention.
Figure 10B:
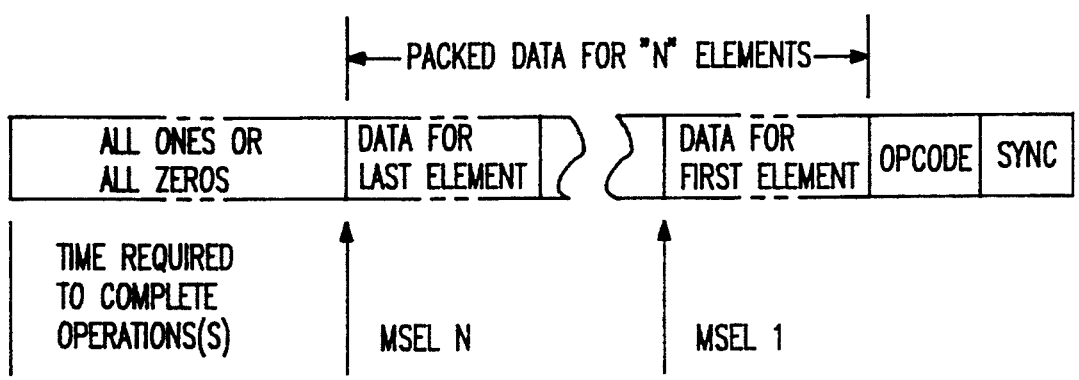
FIG. 10B Depicts a typical packed data format for the column/row distribution of FIG. 10A.

In this configuration, a packed data format would be used in a preferred embodiment, such packed data format being characterized by the data stream for all elements on the bus being preceded by one sync character and an OPCODE. Data distribution is achieved by signalling each module on the bus, over its corresponding MSEL line, when the data just received by the module from the SDIN bus is meant for that particular module. When an MSEL signal is received by a module, the CLU of that module inputs the synchronized and assembled data from the CLU data bus and performs any required operations on that data. A typical column/row distribution is shown in FIG. 10A and the preferred packed data format is shown in FIG. 10B.

A.3 SDIN in Conjunction with K Pin Wired Address

This configuration also reflects a column/row distributed architecture, similarly to that of SDIN in conjunction with MSEL, above, with the bussed element in a column/row being addressed by the K Pin Wired Input, where K is given by:

$$K = \lceil \log_2(\text{number of elements in a column/row}) \rceil$$

Figure 11A:
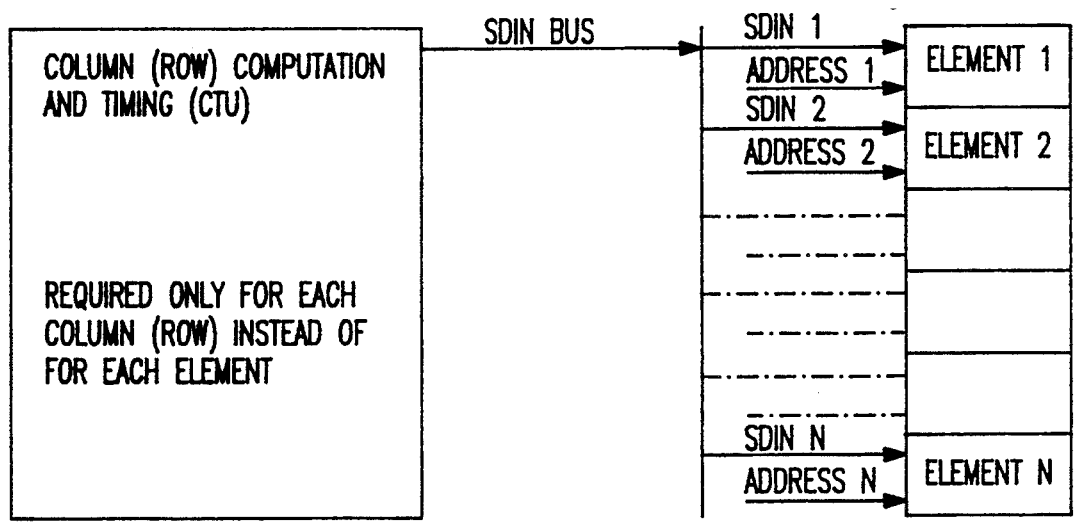
FIG. 11A Depicts a typical column/row distribution for input data using the K Pin Wired Address functionality of the invention.
Figure 11B:
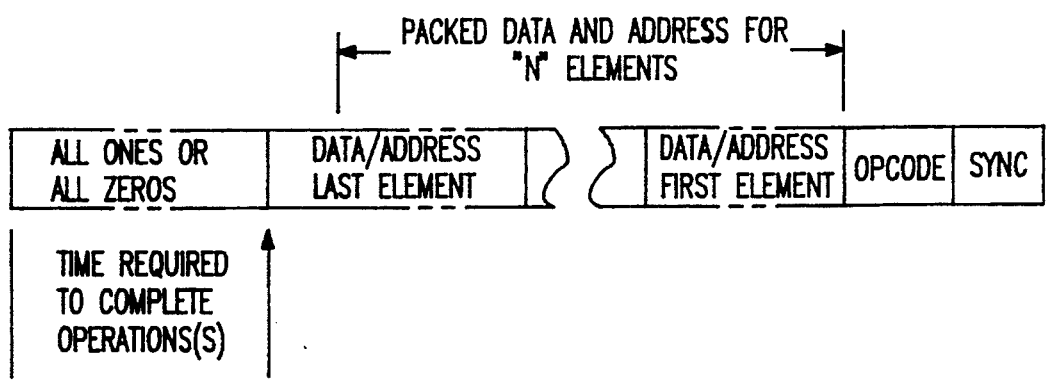
FIG. 11B Depicts a typical packed data format for the column/row distribution of FIG. 11A.

All bussed elements share input signal bus SDIN, but only the element with the matching wired address accepts data. A typical column/row distribution is shown in FIG. 11A with the preferred data format shown in FIG. 11B.

B. EEPROM Storage

As will be understood, EEPROM storage requirements depend on system requirements and the relationship between various parameters. In a typical system embodiment, the following parameters would be relevant to defining EEPROM storage requirements:

a) Control phase: 4 bits b) Control Frequency Code: 2 bits
c) Control Code: 2 bits
d) Control Gain: 4 bits
e) Output to Module: Phase 5 bits Gain 5 bits For this typical system configuration, EEPROM storage requirements with phase-gain interaction and without phase-gain interaction are 8K×8 bits and 1K×8 bits, respectively. However, in the preferred embodiment of the invention, the total EEPROM storage requirement will be 8K×16 bits, covering 8 temperatures states, 16 phase states, 4 frequency states, 13 receive gain states and 3 transmit power levels. The outputs to the T/R module will be: 5 digital phase bits, one analog phase signal derived from 4 digital phase bits, and one analog gain control derived from seven digital bits.

Figure 12:
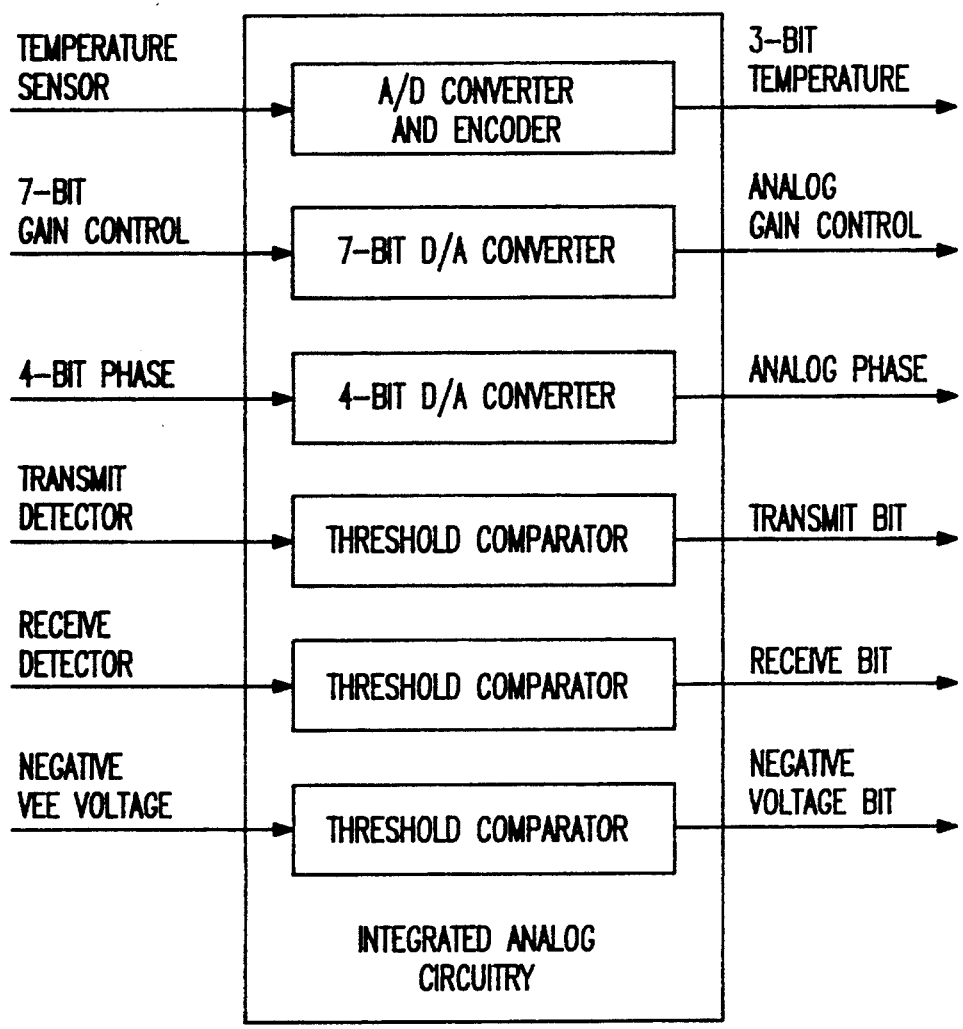
FIG. 12 Depicts the analog RF interface circuitry for the invention.

C. Analog Circuitry The analog circuitry of the IMCO (FIG. 12) is composed of the following elements:

1) Analog-to-Digital (A/D) Converter for temperature encoding;
2) Digital-to-Analog (D/A) Converter for gain control;
3) D/A Convertor for fine phase tuning;
4) Threshold Comparator for transmit BIT;
5) Threshold Comparator for receive BIT; and
6) Threshold Comparator for negative VEE BIT.

The A/D Converter for temperature encoding takes an analog signal from a temperature probe and digitizes it for use by Control Logic Unit 220 (FIG. 7) in addressing the EEPROM. As discussed previously, internal temperature addressing is optional. The D/A Converter for gain control converts the 7 bit digital correction gain signal, derived from the EEPROM, into an analog voltage signal which controls the RF gain control elements of FIG. 4 to provide the proper corrected gain for the module. The D/A Converter for fine phase tuning converts the 4 bit digital correction phase signal into an analog signal which is used for controlling an analog RF phase shifter to provide the proper corrected output phase for the module.

The Threshhold Comparator for transmit BIT compares the voltage level of a detected RF signal, derived from a directional coupler in the RF line located just before the module output to the radiating element (FIG. 4), to a predetermined voltage level and produces an output signal indicating whether the module is currently transmitting or not. The Threshold Comparator for receive BIT compares the voltage level of a detected RF signal, derived from a directional coupler in the RF line located between the RF feed and the module phase shifter (FIG. 4), to a predetermined voltage level and produces an output signal indicating whether the module is currently receiving or not. The outputs of the transmit and receive BIT Threshold Comparators are fed into the digital logic circuitry (FIG. 7) and can be sent out as diagnostic data on the SDOUT data line if requested.

The Threshold Comparator for negative VEE compares the current negative voltage level of VEE to a predetermined voltage level and produces an output signal indicating whether there is an absence of negative voltage in the module. This signal is fed into the CLU (FIG. 7) which will automatically switch the T/R module into STANDBY mode if no negative voltage is present. This signal is also made a part of the Module Status signal (FIG. 7) which is a selectable diagnostic data ouput for the SDOUT line.

Herein, an improved system for controlling the operation of a transmit/receive module in a phased-array antenna system, incorporating either a distributed or semi-distributed beam steering architecture, has been described. Although the present embodiment of the invention has been described in detail., it should be understood that various changes, alterations and substitutions can be made therein without departing from the spirit and scope of the invention as defined by the appended claims.

I claim:

1. In an active array antenna system comprising beam steering computation means, for computing array phase and gain settings, beam shaping means for applying beam shaping and tapering terms to said computed array phase and gain settings, and a transmit/receive means including phase shifting means, gain control means, power amplifying means, low-noise amplifying means and transmit/receive switching means, the improvement therein comprising, in combination therewith:

RF device control means operable to control said operating elements included in said transmit/receive means; and
RF device phase and amplitude correction means operable to compensate for errors associated with said operating elements included in said transmit/receive means;
wherein said RF device control means and said RF device phase and amplitude correction means are operationally integrated within a common module.

2. The system of claim 1 wherein said RF device control means and said RF device phase and amplitude correction means are implemented in a fully distributed beam steering architecture.

3. The system of claim 1 wherein said RF device control means and said RF device phase and amplitude correction means are implemented in a row/column distributed beam steering architecture.

4. The system of claim 1 wherein said integrated RF device control means and RF device phase and amplitude correction means is implemented in a simple integrated circuit chip.

5. An active array antenna comprising:
beam steering computation means, for computing array phase and gain settings;
beam shaping means for applying beam shaping and tapering terms to said computed array phase and gain settings;
a plurality of transmit/receive modules, each including phase shifting means, gain control means, power amplifying means, low-noise amplifying means, and transmit/receive switching means; and
means for controlling each of said transmit/receive modules, including;
RF device control means operable to control said operating elements included in said transmit/receive means and
RF device phase and amplitude correction means operable to compensate for errors associated with said operating elements included in said transmit/receive means;
wherein said RF device control means and said RF device phase and amplitude correction means are operationally integrated within a common module.

6. The system of claim 5 wherein said module control means further includes a module select line control interface whereby input signals to said module control means may be connected in a common bus configuration.

7. The system of claim 5 wherein said module control means further includes a K Pin Wired Address line control interface where $K = \min [\lceil \log_2 M \rceil, \lceil \log_2 N \rceil]$, M being a maximum number of elements in any row of said array antenna and N being a maximum number of elements in any column of said array antenna, and whereby input signals to said module control means may be connected in a common bus configuration.

8. The system of claim 5 wherein each of said module control means operates in response to a dedicated input data line.

9. The system of claim 5 wherein each of said module control means operates in response a bussed input data line, whereby bussed modules in a common antenna array row or column share an input line using said K Pin Wired Address line control interface for addressing.

10. The system of claim 5 wherein each of said module control means operates in response a bussed input data line, whereby bussed modules in a common antenna array row or column share an input line using said module select line control interface for addressing.

11. The system of claim 5 wherein said module control means further includes a plurality of input registers, a plurality of holding registers, a plurality of output registers and an EEPROM data storage means, and whereby said output registers may be selected through an external control signal or through an operation code stored in said EEPROM data storage means.

12. The system of claim 11 wherein said EEPROM data storage means operates to store correction data for said transmit/receive module and whereby correction data storage is implemented in a neutral environment, thereby rendering said module control means interchangeable with an electronically equivalent module control means having correction data stored in its associated EEPROM data storage means in said neutral environment.

13. The system of claim 11 wherein said EEPROM data storage means operates to store correction data for said transmit/receive module and whereby correction data storage is implemented in an operating environment for said array antenna.

14. The system of claim 11 wherein said EEPROM data storage means operates to store correction data for changes in temperature of said transmit/receive module and whereby said temperature correction data for said EEPROM data storage means may be addressed by data generated externally to said module.

15. The system of claim 11 wherein said EEPROM data storage means operates to store correction data for changes in temperature of said transmit/receive module and whereby said temperature correction data for said EEPROM data storage means may be addressed by data generated internally to said module.

* * * * *